United States Patent [19]

Kavanagh et al.

[11] Patent Number: 5,638,142
[45] Date of Patent: Jun. 10, 1997

[54] SPATIAL LIGHT MODULATOR SYSTEM INCLUDING A PLURALITY OF TILTABLE MIRROR DEVICES AND REFLECTIVE MEANS FOR EQUALIZING THE NUMBER OF REFLECTIONS FROM THE TILTABLE MIRROR DEVICES

[75] Inventors: Martin Kavanagh, Dobcross; Raymond G. Fielding, Royton, both of Great Britain

[73] Assignee: Rank Brimar LImited, United Kingdom

[21] Appl. No.: 313,273
[22] PCT Filed: Apr. 1, 1993
[86] PCT No.: PCT/GB93/00690
§ 371 Date: Oct. 26, 1994
§ 102(e) Date: Oct. 26, 1994
[87] PCT Pub. No.: WO93/20656
PCT Pub. Date: Oct. 14, 1993

[30] Foreign Application Priority Data

Apr. 3, 1992 [GB] United Kingdom ............ 9208076

[51] Int. Cl.$^6$ ..................................... H04N 9/31
[52] U.S. Cl. ............................. 348/756; 348/755
[58] Field of Search .................... 348/744, 755, 348/745, 770, 750, 771, 751, 758, 759, 756; 359/629, 654; H01N 5/74, 9/31

[56] References Cited

U.S. PATENT DOCUMENTS

| 4,541,688 | 9/1985 | Watt et al. |
| 4,680,579 | 7/1987 | Ott .......................... 340/783 |
| 5,305,146 | 4/1994 | Nakagaki et al. ............ 359/634 |

FOREIGN PATENT DOCUMENTS

| 0139991 | 5/1985 | European Pat. Off. |
| 0198655 | 10/1986 | European Pat. Off. |
| 0303898 | 2/1989 | European Pat. Off. |
| 0363767 | 4/1990 | European Pat. Off. |
| 0401912 | 12/1990 | European Pat. Off. |
| 0418947 | 3/1991 | European Pat. Off. |
| 0013885 | 1/1986 | Japan .................. H04N 9/31 |
| 0177079 | 8/1986 | Japan .................. H04N 5/74 |
| 5-249408 | 9/1993 | Japan .................. H04N 9/31 |
| 5-281511 | 10/1993 | Japan .................. H04N 9/31 |
| 6-138430 | 5/1994 | Japan .................. H04N 9/31 |
| 2046937 | 11/1980 | United Kingdom . |
| 3829598 | 3/1990 | United Kingdom ....... H04N 9/31 |
| 2252173 | 7/1992 | United Kingdom . |
| 8905470 | 6/1989 | WIPO . |
| 9115923 | 10/1991 | WIPO .................. H04N 9/31 |
| 9201356 | 1/1992 | WIPO . |

OTHER PUBLICATIONS

Patent Abstracts of Japan, vol. 12, No. 328, Sep. 6, 1988; JP.A.63 092 192 Apr. 22, 1988.
Patent Abstracts of Japan, vol. 16, No. 565, Dec. 7, 1992; JP.A.04 216 543 Aug. 6, 1992.
Patent Abstracts of Japan, vol. 15, No. 418, Oct. 23, 1991; JP.A.03 170 925 Jul. 24, 1991.
Patent Abstracts of Japan, vol. 16, No. 301, Jul. 3, 1992; JP.A.04 080 740 Mar. 13, 1992.

*Primary Examiner*—Victor R. Kostak
*Attorney, Agent, or Firm*—Lerner, David, Littenberg, Krumholz & Mentlik

[57] ABSTRACT

A spatial light modulator system includes a multi-wavelength light source and three spatial light modulators, two dichroic mirrors are arranged in the light path between the light source and the spatial light modulators so as to direct light within a different wavelength band onto all but one of the spatial light modulators, light to the third spatial light modulator passing through the dichroic mirror onto the third spatial light modulator. Spatially modulated light reflected from the spatial light modulators is combined by the two dichroic mirrors to produce a multi-wavelength spatially modulated output beam. In order to equalize the number of reflections uundergone by spatially modulated light from all the spatial light modulators a reflector is provided in the optical path between the third spatial light modulator and the output beam.

7 Claims, 4 Drawing Sheets

5,638,142

SPATIAL LIGHT MODULATOR SYSTEM INCLUDING A PLURALITY OF TILTABLE MIRROR DEVICES AND REFLECTIVE MEANS FOR EQUALIZING THE NUMBER OF REFLECTIONS FROM THE TILTABLE MIRROR DEVICES

BACKGROUND OF THE INVENTION

1. Field of the Invention

This invention relates to a spatial light modulator system. The invention has particular, although not exclusive relevance to this a spatial light modulator system for use in a projection system in which a projected display is formed by modulating light from a light source by a spatial light modulator device, and then projecting the modulated light on to a display area in which beams having different color content are modulated by different spatial light modulator devices each driven in accordance with a different video signal, and the modulated beams are combined to form a single projected color display.

2. Description of the Related Art

A spatial light modulator is an optical component which is controllable to modulate an incident light beam. A relatively old example of such a spatial light modulator is the eidophor, a layer of oil scanned by a cathode ray. A more recent example of spatial light modulators is an active matrix device, comprising a matrix of individually addressed pixel light valves or modulators; the liquid crystal modulator array described in, for example, EP 0401912 is one modulator array of this type. In EP 0401912, a liquid crystal matrix is provided in a light path to transmit in a variable manner, and hence amplitude modulate, an incident light beam (without altering its path or optical axis). Another example of an active matrix device is the tiltable mirror array, the so called "deformable mirror device" described in, for example, U.S. Pat. Nos. 4,856,863, 4,615,595, and 4,596,992.

Such deformable mirror devices comprise an array of miniature mirrored cantilever beam elements each carrying electrodes so as to be electro statically deflectable between two positions. The extent of the deflection can be controlled by the applied electrostatic potential to provide variable degrees of reflection, or the device can be operated in a binary manner by applying predetermined electrostatic potentials to switch between discrete deflection states. Each element thus angularly deflects the incident light beam and hence changes the optical axis of the light beam.

By using an array of such elements, each individually addressable, a two dimensional image can be reproduced by exposing the array to an incident light beam, modulating the incident beam by controlling the individual mirror devices from a picture signal, and collating the beam reflected in a particular direction. The small size and fast switching times of such deformable mirror devices makes them usable at video picture data rates, enabling the display of television or video moving images on a display screen onto which the collated beam is projected.

The incident beam is not scanned, as is an electron beam, but illuminates the entire device. In order to display a color image, therefore, it is necessary to provide three separately illuminated arrays of mirrored cantilever beam elements, each array being responsive to a different primary color or primary color combination, and to combine optically the modulated beams reflected from each array onto a single optical display.

One example of an application of such a system is in large scale displays as disclosed in our earlier International Applications WO91/15843, WO91/15923, PCT/GB92/00002, and PCT/GB92/00132, and PCT/GB93/00456 published as WO92/12506, and WO92/13424, and WO93/18620 respectively (all of which are incorporated herein by reference).

In PCT/GB93/00456 published as WO93/18620, the described embodiment has a pair of colour dependent splitter and combiner surfaces, so that an incoming white light beam is split into a first pair of beam components, one of the pair of beam components then being further split into a second pair of beam components. For example, the first dichroic surface may reflect a blue beam to a first tiltable mirror array, and the transmitted beam is then split by the second dichroic surface into a reflected red beam and a transmitted green beam. Each of the red, blue and green beams is then supplied to a respective tiltable mirror array, which modulates the respective beam, and the modulated beams are then recombined in the same manner by the dichroic surfaces (although they could be combined by different dichroic surfaces in principle).

The coloured beams impinging on the tiltable mirror array are symmetrical and hence the number of reflections that they have been through is irrelevant. However, the beams modulated by the arrays have a defined "handedness", and each time the beam is reflected the "handedness" will be reversed. To combine all three modulated beams into a single colour image, the handedness of each must be the same. However, where the same surfaces are used both to split and to combine the beams as described above, then it is necessary to provide that the modulator modulating the green beam does so to generate a mirror reversed image, since the green beam is arranged to be transmitted through both dichroic surfaces without reflection, whereas the red and blue beams are each reflected once.

SUMMARY OF THE INVENTION

The present invention provides an extra reflective element in at least one of the beam paths, so as to ensure that the handedness of all three beams is the same.

Preferably, for simplicity, a single reflector is provided in the green beam path from the tiltable mirror array modulated with the green video signal (green being the colour transmitted through both dichroic layers). However, it would equally be possible to provide an extra reflection in the red and blue beam paths, if necessary.

WO93/18620 describes a system in which the dichroic surfaces are provided as internal surfaces within a prism. However, in some circumstances, it is preferred to provide the dichroic surfaces on glass plates. In such arrangements, the dichroic surfaces may be provided on the front surface of a parallel sided glass plate. Thus the component of the beam which is reflected by the dichroic surface does not pass through the glass plate, whilst the component of the beam which is transmitted by the dichroic surface also passes through the glass plate. Where the beam is non-parallel, an inclined parallel sided glass plate in the beam path generates astigmatism distortion within the beam, since some parts of the beam impinge on the plate with a smaller diameter than other parts of the beam. Thus, for each of the dichroic surfaces, the transmitted beam is distorted by astigmatism whereas the reflected beam is undistorted. Accordingly, on recombining the modulated beams from the three tiltable mirror arrays devices the three modulated beams will suffer to different extents from astigmatism, and hence the modulated beams will be distorted with their mutual alignment degraded.

Accordingly, in another aspect, the invention provides spatial light modulator system comprising a plurality of spatial light modulators, means for illuminating the spatial light modulators, and means for combining the beams modulated thereby into a composite multi wavelength beam, the means for combining comprising a wavelength dependent reflective surface, lying inclined to the beam path so as to cause distortion of the non-parallel beam transmitted therethrough, and the system further comprising means for correcting the distortion.

Preferably, the means for correcting the distortion comprises a substantially plate identically dimensioned to a plate carrying said wavelength dependent surface positioned in a light path of the system and aligned so as to reverse the astigmatism.

A spatial light modulator system in accordance with the invention may be used in a display system. The spatial light modulators may comprise tiltable mirror device arrays. The optical arrangement may be as described in our copending Application No. WO92/13424.

Other aspects and preferred embodiments of the invention are as described or as claimed hereafter.

BRIEF DESCRIPTION OF THE DRAWINGS

Embodiments of the invention will now be illustrated, by way of example only, with reference to the accompanying drawings in which.

DESCRIPTION OF THE PREFERRED EMBODIMENTS

Figure 1:
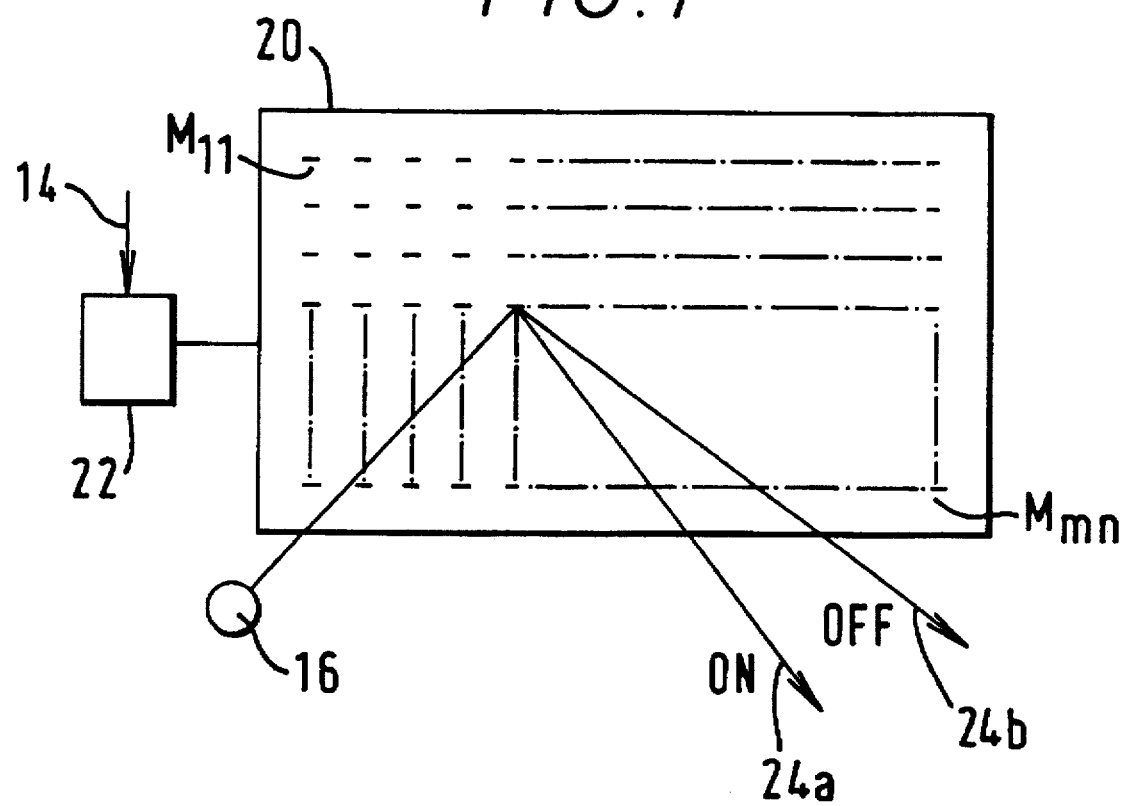
FIG. 1 shows schematically the structure of a spatial light modulator array device as described in our co-pending application PCT/GB92/00002 published as WO92/12506.

Referring to FIG. 1, a tiltable mirror device array for use in the invention comprises an array of typically m×n deflectable mirror devices; typically, on the order of 500×500 devices for a low resolution display or 2000×2000 devices for a high resolution display. The array 20 is connected to an addressing circuit 22 which receives the color signal from the circuit 14, and addresses each of the respective reflectors $M_{11}$-$M_{mn}$, as described in our earlier International application number PCT/GB92/00002 published as WO92/12506 filed 2 Jan. 1992 (Agents ref. 3203299, WO92/12506 incorporated herein by reference). Each reflector is thus operated between one of two reflection states corresponding to different reflector positions; an "on" state in which reflected light is directed in a first path 24a and an "off" state in which light is directed in a second path 24b. The second path 24b is disposed to lie away from subsequent optical components of the system, the light passing along the path 24b into a beam dump (not shown). Thus, when viewed along the "on" path 24a, at an instant, the array 20 displays a two dimensional image, those modulators which are set to a first deflection state appearing bright and those which are set to a second deflection state appearing dark.

Figure 2:
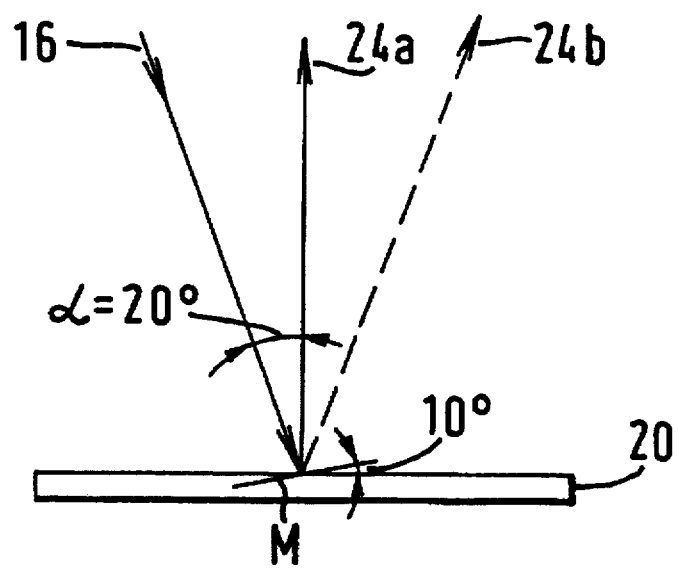
FIG. 2 shows schematically the optical illumination of a portion of the device of FIG. 1.

Referring to FIG. 2, the angle through which each reflector is deflected between the two states is relatively small and thus, in order to achieve good discrimination between the two states the incident light beam from the source 16 is directed towards the array 20 at an angle α (from the normal to the display) of around 20 degrees. When an individual reflector device M is lying parallel to the plane of the array 20, the incident beam is reflected at a corresponding angle of 20 degrees to the normal along path 24b, but when the control signal from the addressing circuit 22 sets the deflector M into a second deflection state at an angle to the plane of the array 20, the incident beam is reflected out along the normal angle to the array on the path 24a.

Figure 3:
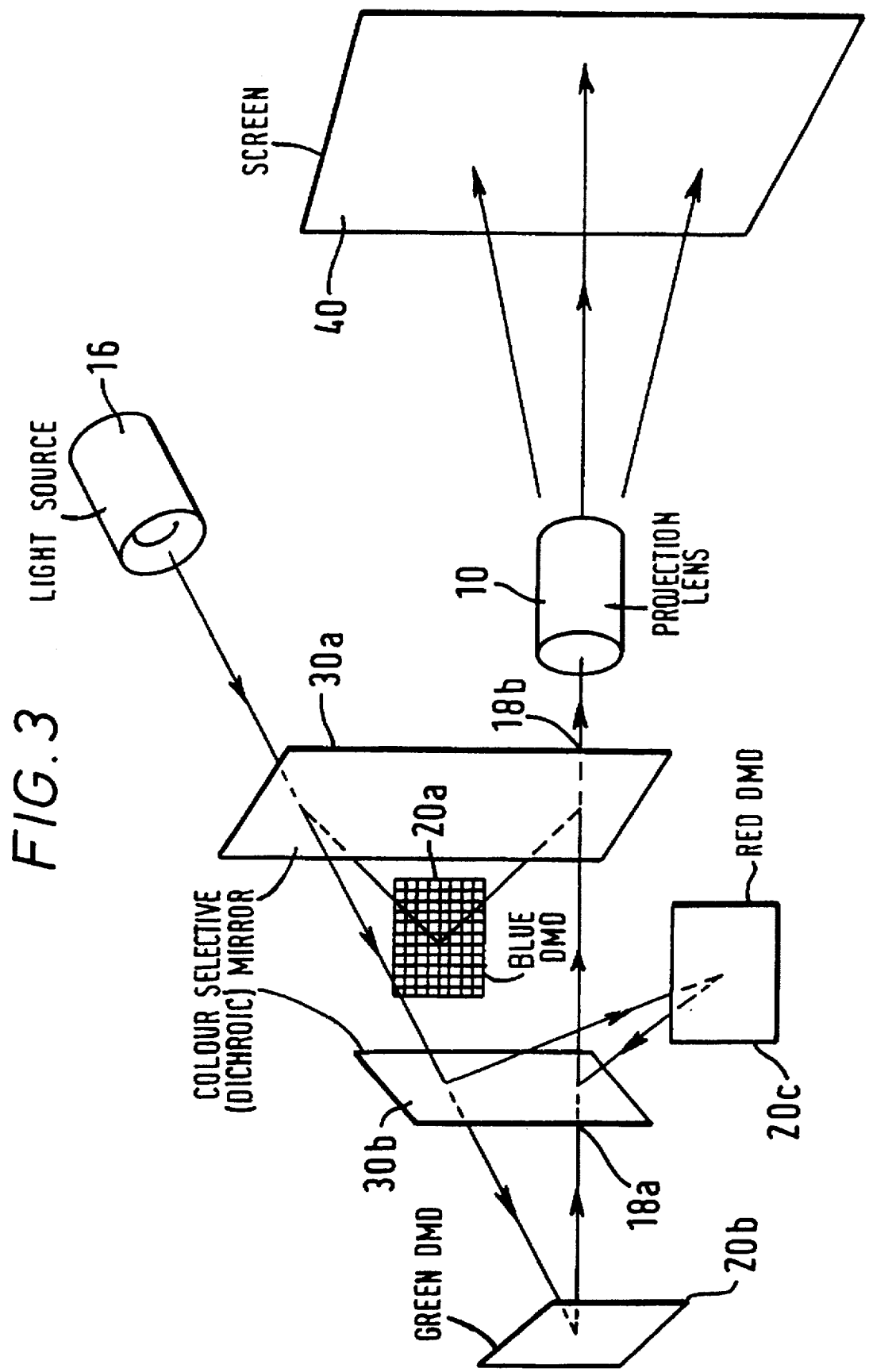
FIG. 3 shows a diagramatic perspective view of a color optical projection display system incorporating the array of FIGS. 1 and 2.

Referring to FIG. 3, a white light source 16, comprising a high power lamp, generates light along an incident light path which is for example in a plane normal to that of a display screen 40. For example, the light source 16 may be positioned above the display screen 40. A planar tiltable mirror display device 20b is positioned spaced apart from and in a plane parallel to the screen 40, and the light source 16 is arranged to illuminate the array 20b at an angle of 20 degrees to its normal axis. The array 20b is arranged to deflect the incident beam to illuminate the screen 40 via a projection lens 10.

Positioned within the optical paths of the incident and deflected beams are a pair of glass plates 30a, 30b each of which carries a respective layer 18b,18a which acts as a dichroic mirror so as to act as beam splitters or beam combiners dependent on the direction of the incident light beam on the layers 18b,18a. The plates 30a,30b are both inclined to the optic axis, the plates 30a,30b being rotated about the vertical axis relative to the plane of the screen 40 by some angle (typically between 20 and 70 degrees, and preferably 45 degrees) such as to reflect the incident beam to further tiltable mirror deflector arrays 20a,20c.

The arrays 20a,20c are positioned at a distance such that the optical path traversed from each array 20a–20c to the screen 10 is the same. The first splitter/combiner layer 18b reflects a blue light component beam to a deformable mirror display array 20a which is modulated in response to the blue color signal component of the picture to be displayed. Consequently, the modulated reflected beam is deflected vertically by 20 degrees but is substantially horizontally unmodified. The layer 18b transmits red and green wavelength components of the light from the source 16 substantially unattenuated.

The second layer 30b reflects red wavelength components of the light from the source 16, directing these components to a second tiltable mirror device array 20c which is modulated in response to the red color signal component of the picture to be displayed and consequently deflected 20 degrees vertically. The second layer 30b allows the green optical wavelength components of the light from the source 16 to pass substantially unattenuated, to be deflected by a third tiltable mirror device array 20b responsive to the green color signal component of the picture to be displayed.

The modulated green beam passes unattenuated back through both plates and layers 30b,30a,18a,18b, through the projection lens 10 and onto the screen 40. At the first dichroic layer reached, 18a, the modulated beam from the red array 20c is reflected into the same path as the modulated green beam and at the second layer 18b the modulated signal from the blue array is reflected back into the same optical path so that the light beam entering the projection lens 10 comprises the recombined and modulated red, blue and green color beams.

Figure 4A:
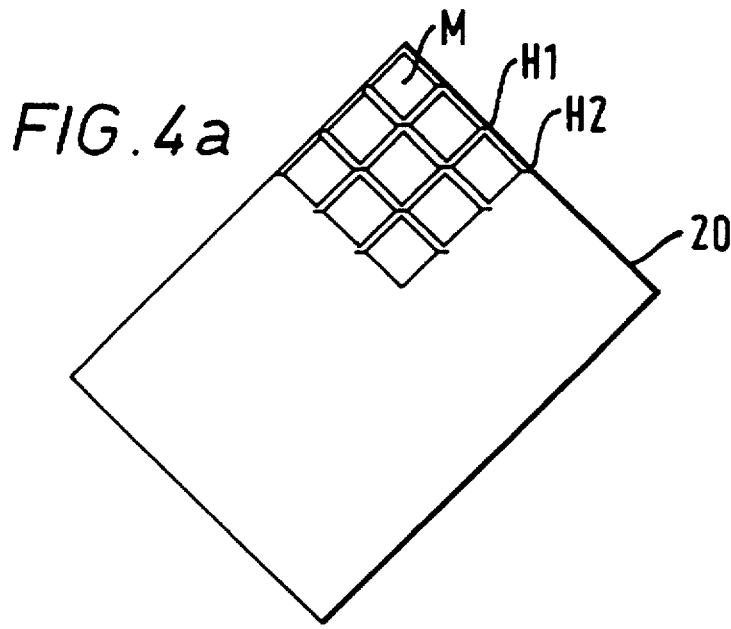
FIG. 4A shows schematically an embodiment of a spatial light modulator array as indicated in FIG. 1.

As shown in FIG. 4A, a tiltable mirror array 20 may comprise a plurality of square mirrors, arranged in an array having an aspect ratio not equal to unity (as is usually the case with video pictures). In the particular array illustrated, the mirrors M are supported by hinges H running between diagonal corners of each mirror so that, as shown in FIG. 4A, the hinges H1, H2 run horizontally where the mirrors are arranged diagonally across the array. The vertical deflection of the incident beam on the array 20 thus depend upon the angle at which the mirrors M are pivoted around the hinges H. The arrays 20 thus have an inherent asymmetry about their axis of reflection when incorporated in the system shown in FIG. 3.

Figure 4B:
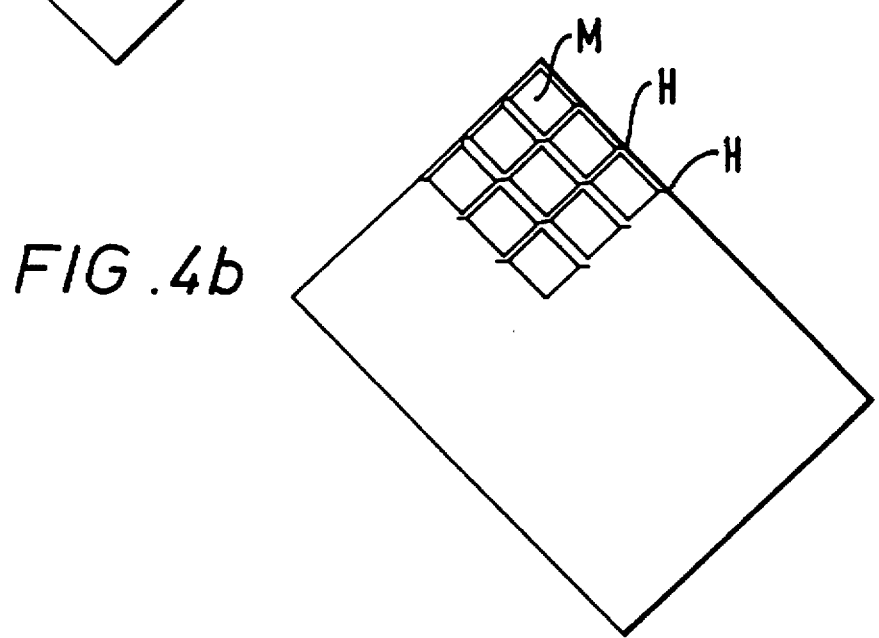
FIG. 4B shows schematically the mirror image of FIG. 4A.

Referring to FIG. 4B, where the aspect ratio is not unity, then the mirror image of the array is not the same shape as the array. Thus, where the aspect ratio is not unity, in the arrangement of FIG. 3 the modulated beams from the blue array 20a and red array 20c are mirror reversed by the combined reflections from the layers 18a,18b and thus correspond to FIG. 4B, whereas the modulated beam from the green array 20b is transmitted through both the layers 18a,18b and thus corresponds to FIG. 4A and cannot be combined with the other two modulated beams.

Figure 5:
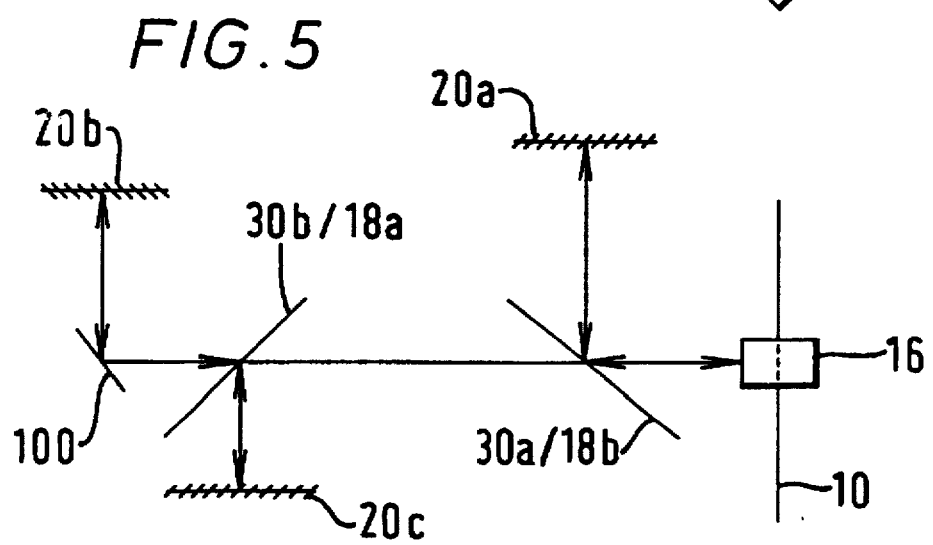
FIG. 5 shows schematically the optical arrangement of a first embodiment of the invention.

In order to overcome this problem, referring to FIG. 5, in the first embodiment of a system in accordance with the invention a reflector 100 is provided in the beam path between the plate 30b carrying layer 18a and the green array 20b. Thus, the modulated beam from the green array 20b is mirror reversed by the reflector 100, and has the same handedness as the modulated beams from the red and blue arrays 20a,20c so as to project a combined colour picture onto the screen 40. It will be seen, however, that the system shown in FIG. 5 is still relatively compact, using any two dichroic layers 18b,18a and the additional reflector 100 to optically address the three arrays 20a,20b,20c.

Figure 6:
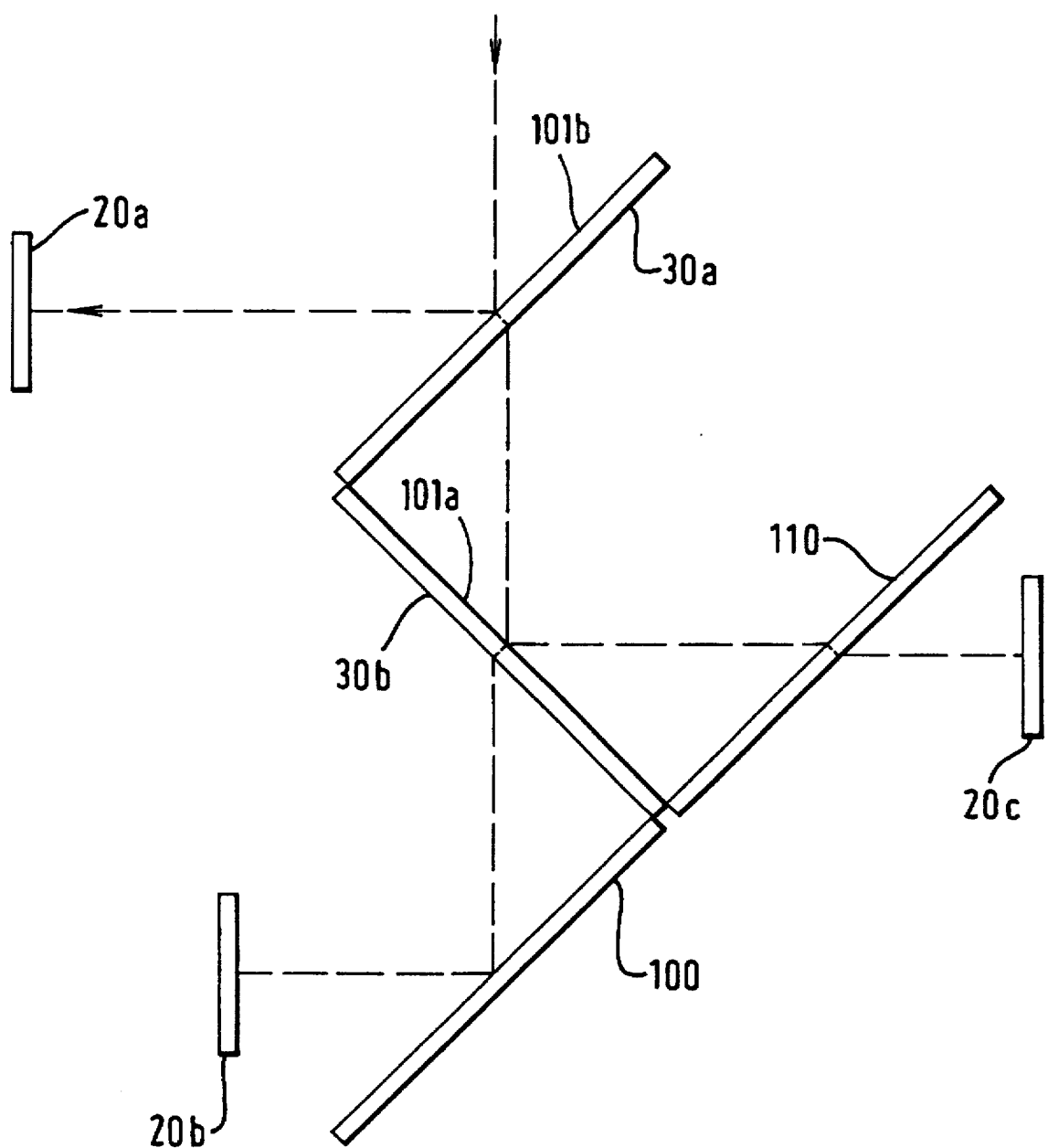
FIG. 6 shows schematically the optical arrangement of a second embodiment of the invention.

Referring now to FIG. 6, the layers 18a,18b of FIG. 5 may be provided as films 101a,101b on the surface of the transmissive plates 30b,30a, which are perpendicular to each other the plates being necessarily inclined to the incident beam path so as to reflect light out of or into the beam path from the arrays 20a,b,c. Accordingly, light from the light source 16 is bent by refraction as it passes through the parallel plates 30a,30b. As the beam from the light source 16 is diverging on its route through the projection system to the screen 40, and as the plates 30a,30b are inclined in the beam path, the plates 30a,30b introduce both spherical distortion and astigmatism into the modulated beam.

The beam to and from the array 20a is reflected from the dichroic surface 101a without being transmitted through any plate 30a,30b, and consequently is not distorted by refraction through the plates. The beam to and from the green array 20b, however, has distortion introduced by the first plate 30a. Thus distortion will, however, be compensated for by the second plate 30b, which is inclined in the beam path at the opposite angle to the plate 30a (i.e 180° minus the angle at which the first plate is inclined). Furthermore the second plate 30b is of identical thickness and refractive index to the first plate 30a. Thus equal and opposite astigmatic distortion is introduced by the second plate 30b which cancels that introduced by the first plate 30a.

It will be seen, however, that in the case of the beam to and from the red array 20c, the beam will be distorted by the first plate 30a, but not by the second plate 30b as the beam is reflected by the layer 18a carried by the second plate 30b.

The astigmatic distortion introduced by the first plate 30a is, however, compensated for by a third glass plate 110 of identical thickness and refractive index (i.e optical path length) to the first plate 30a. The plate 110 is introduced into the beam path between the second plate 30b and the red array 20c, and aligned at an equal and opposite angle to that beam path to that of the first plate 30a. Thus, the distortion introduced by the first plate 30a in the red beam is cancelled by the extra plate 110.

The arrangement of FIG. 6 can be modified with the same effect being achieved. For instance, the plate 110 could be provided within the path between the plates 30a and 30b, with an additional plate being provided between the plate 30b and the green array 20b.

Further, the second plate 30b could be arranged at an angle deviating from the opposite angle to the angle 56 inclination to the optical axis of the first plate 30a, or could be of a different thickness, if further correcting plates (not shown) are provided to complete the correction.

It will be appreciated, however, that the arrangement shown in FIG. 6 provides a particularly compact system with minimal optical components.

It will be appreciated that whilst it is particularly advantageous to incorporate both the extra reflector 100 and the additional plate 110 in the system in accordance with the invention, either the extra reflector or the further plate alone are beneficial to the system.

We claim:

1. A spatial light modulator system comprising: a multi wavelength light source; a plurality of tiltable mirror devices; a plurality of dichroic mirror elements arranged in the light path between the light source and the tiltable mirror devices so as to reflect light within a different wavelength band onto all but one of the tiltable mirror devices, light to said one tiltable mirror devices passing through the dichroic mirror elements onto said one tiltable mirror device and means for combining the modulated light from the tiltable mirror devices, said system being characterized in including a reflective means provided in the optical path from said one of the tiltable mirror devices in order to equalize the number of reflections undergone by modulated light from all of the tiltable mirror devices.

2. A system according to claim 1, in which there are three tiltable mirror devices and two dichroic mirror elements.

3. A system according to claim 1, in which each dichroic mirror element is provided on an optically transmissive component and in which the optically transmissive components age angled with respect to the optical axis of the system so as to introduce distortion into the modulated combined beam, the system further including at least one transmissive component of optical characteristics and set at an angle with respect to the optical axis of the system so as to cancel said distortion.

4. A system according to claim 3, in which there are three transmissive components each of equal optical path length, and angled with respect to the optical axis of the system so as mutually to compensate for distortions produced by the transmissive elements.

5. A display system including a spatial light modulator system according to claim 1.

6. A spatial light modulator system comprising: a light source; a plurality of tiltable mirror devices; a plurality of dichroic mirror elements arranged in the light path between the light source and the tiltable mirror devices, and means for combining the modulated light from the tiltable mirror devices, wherein each dichroic mirror element is provided on an optically transmissive component an in which the optically transmissive components are angled with respect to the optical axis of the system so as to introduce distortion into the modulated combined beam, and at least one further transmissive component of optical characteristics set at an angle with respect to the optical axis of the system so as to cancel said distortion.

7. A display system including a spatial light modulator system according to claim 6.

* * * * *

UNITED STATES PATENT AND TRADEMARK OFFICE
CERTIFICATE OF CORRECTION

PATENT NO. : 5,638,142
DATED : June 10, 1997
INVENTOR(S) : Kavanagh et al.

It is certified that error appears in the above-indentified patent and that said Letters Patent is hereby corrected as shown below:

In the Abstract, line 12, "uundergone" should read --undergone--.

Column 1, line 11, "this a" should read --this--.

Column 1, line 40, "electro statically" should read --electrostatically--.

Column 3, line 10, "substantially plate" should read --plate substantially--.

Column 5, line 11, "depend" should read --depends--.

Column 5, line 42, "other the" should read --other, the--.

Column 5, line 51, "the array" should read --the blue array--.

Column 5, line 59, "Furthermore the" should read --Furthermore, the--.

Column 6, line 27, "are" should read --is--.

Column 6, line 48, "age" should read --are--.

Column 6, line 50, "one" should read --one further--.

Column 6, line 67, "an in" should read --and in--.

Signed and Sealed this

Second Day of September, 1997

*Attest:*

BRUCE LEHMAN

*Attesting Officer*     *Commissioner of Patents and Trademarks*